(12) United States Patent
Wang et al.

(10) Patent No.: US 10,528,499 B2
(45) Date of Patent: Jan. 7, 2020

(54) ON-BOARD UNIT AND METHOD FOR IMPROVING PERFORMANCE OF TRANSMITTING AND RECEIVING THEREOF

(71) Applicant: Beken Corporation, Shanghai (CN)

(72) Inventors: Yanfeng Wang, Shanghai (CN); Jiazhou Liu, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 122 days.

(21) Appl. No.: 15/912,508

(22) Filed: Mar. 5, 2018

(65) Prior Publication Data
US 2019/0251046 A1     Aug. 15, 2019

(30) Foreign Application Priority Data
Feb. 9, 2018 (CN) .......................... 2018 1 0136325

(51) Int. Cl.
| | |
|---|---|
| *G06F 13/24* | (2006.01) |
| *H04B 1/40* | (2015.01) |
| *G07C 5/08* | (2006.01) |
| *G07B 15/06* | (2011.01) |

(52) U.S. Cl.
CPC ........... *G06F 13/24* (2013.01); *G07B 15/063* (2013.01); *G07C 5/085* (2013.01); *H04B 1/40* (2013.01)

(58) Field of Classification Search
CPC ....................................................... G06F 13/24
USPC ................................................... 235/384, 385
See application file for complete search history.

(56) References Cited

U.S. PATENT DOCUMENTS

| | | | | |
|---|---|---|---|---|
| 2007/0182549 A1* | 8/2007 | Qi | ............................ | H04Q 9/00 340/539.26 |
| 2010/0290378 A1* | 11/2010 | Wu | .................... | H04W 52/0216 370/311 |
| 2017/0131406 A1* | 5/2017 | Li | ........................... | G01C 21/26 |
| 2019/0096264 A1* | 3/2019 | Park | ......................... | G08G 1/22 |
| 2019/0238369 A1* | 8/2019 | Kim | .................... | G06F 13/4295 |

* cited by examiner

*Primary Examiner* — Allyson N Trail
(74) *Attorney, Agent, or Firm* — Schwegman Lundberg & Woessner, P.A.

(57) ABSTRACT

A method in an on-board unit comprising: receiving and decoding, with a transceiver, a broadcast packet (BCP) from a road side unit (RSU); processing BCP with a micro controller unit (MCU), wherein processing comprises determining whether there is a first interrupt from the transceiver, wherein the first interrupt is used to interrupt idle state of MCU; searching for low level state from a falling edge after the first interrupt; determining whether duration time of low level is within a time range; inputting one byte into the transceiver if duration time is within the range and clearing the first interrupt; determining whether there is a second interrupt from the transceiver, wherein the second interrupt is used to interrupt data reception; processing data in BCP if there is second interrupt; and converting, with the transceiver, processed data to a wireless signal and transmitting the signal to RSU.

12 Claims, 7 Drawing Sheets

ON-BOARD UNIT AND METHOD FOR IMPROVING PERFORMANCE OF TRANSMITTING AND RECEIVING THEREOF

CLAIM OF PRIORITY

This application claims priority to Chinese Application number 201810136325.0, entitled "On-board Unit and Method for Improving Performance of Transmitting and Receiving," filed on Feb. 9, 2018 by Beken Corporation, which is incorporated herein by reference.

TECHNICAL FIELD

The present application relates to dedicated short range communication (DSRC) system for transmitting and receiving traffic information, and more particularly, but not exclusively, to an on-board unit (OBU) used in an electronic toll collection (ETC) system of an expressway network.

BACKGROUND OF THE INVENTION

Generally, there are two ways to perform a transaction in an ETC system. The first way is implemented with a stop bar, that is, vehicles enter into one lane with the stop bar one after another and a road side unit (RSU) of the lane communicates with one vehicle in this lane each time. The second way is called free flow and there is no stop bar in the lane. In this way, vehicles can pass through any lane and the RSU communicates with vehicles in different lanes in the same time period by utilizing multiple time windows to communicate with the on-board units (OBU) of vehicles. Wherein the shortest time window is 192 us, and if the communication cannot be completed within 192 us, the transaction may fail.

To shorten the communication time and complete the transaction, an OBU and a method for improving the performance of transmitting and receiving may be necessary.

BRIEF DESCRIPTION OF THE INVENTION

According to the embodiment of the invention, a method and an OBU use a transceiver module and a micro controller unit (MCU) to improve transmitting and receiving performance.

In an embodiment, the method in an on-board unit (OBU), comprising: receiving and decoding, with a transceiver module, a broadcast packet from a road side unit (RSU); processing, with a micro controller unit (MCU), the broadcast packet from the transceiver module, wherein the processing comprises: determining whether there is a first interrupt from the transceiver module, wherein the first interrupt is used to interrupt the idle state of the MCU; searching for a low level state from a falling edge after the first interrupt if there is the first interrupt; determining whether a duration time of low level is within a time range; inputting one byte into the transceiver module if the duration time is within the time range and clearing the first interrupt; determining whether there is a second interrupt from the transceiver module, wherein the second interrupt is used to interrupt data reception; and processing data in the broadcast packet if there is the second interrupt; and converting, with the transceiver module, processed data to a wireless signal and transmitting the wireless signal to the RSU.

In another embodiment, the processing data in the broadcast packet comprises: reading length and status of the data after the second interrupt; reading contents of the data; analyzing the read contents of the data to obtain specific information from the analyzed data; closing a first channel for receiving the data from the transceiver module and switching to a second channel for transmitting the processed data to the transceiver module; and writing the specific information via the second channel into the transceiver module, wherein the specific information is included in the processed data.

In still another embodiment, the OBU comprises: a transceiver module, configured to receive and decode a broadcast packet from a road side unit (RSU); a micro controller unit (MCU) communicatively coupled to the transceiver module and configured to receive and process the broadcast packet from the transceiver module, wherein the MCU comprises: a determining module, configured to determine whether there is a first interrupt from the transceiver module, wherein the first interrupt is used to interrupt the idle state of the MCU; a searching module, configured to search for a low level state from a falling edge after the first interrupt if there is the first interrupt, and wherein the determining module further configured to determine whether a duration time of low level is within a time range; an inputting module, configured to input one byte into the transceiver module if the duration time is within the time range and clearing the first interrupt, and wherein the determining module further configured to determine whether there is a second interrupt from the transceiver module, and wherein the second interrupt is used to interrupt data reception; and a processing module, configured to process data in the broadcast packet if there is the second interrupt; and wherein the transceiver module is further configured to convert processed data to a wireless signal and transmit the wireless signal to the RSU.

In still another embodiment, the processing module comprises: a first reading module, configured to read length and status of the data after the second interrupt; a second reading module, configured to read contents of the data; an analyzing module, configured to analyze the read contents of the data to obtain specific information from the analyzed data; a switching module, configured to close a first channel for receiving the data from the transceiver module and switch to a second channel for transmitting the processed data to the transceiver module; and a writing module, configured to write the specific information via the second channel into the transceiver module, wherein the specific information is included in the processed data.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-know structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
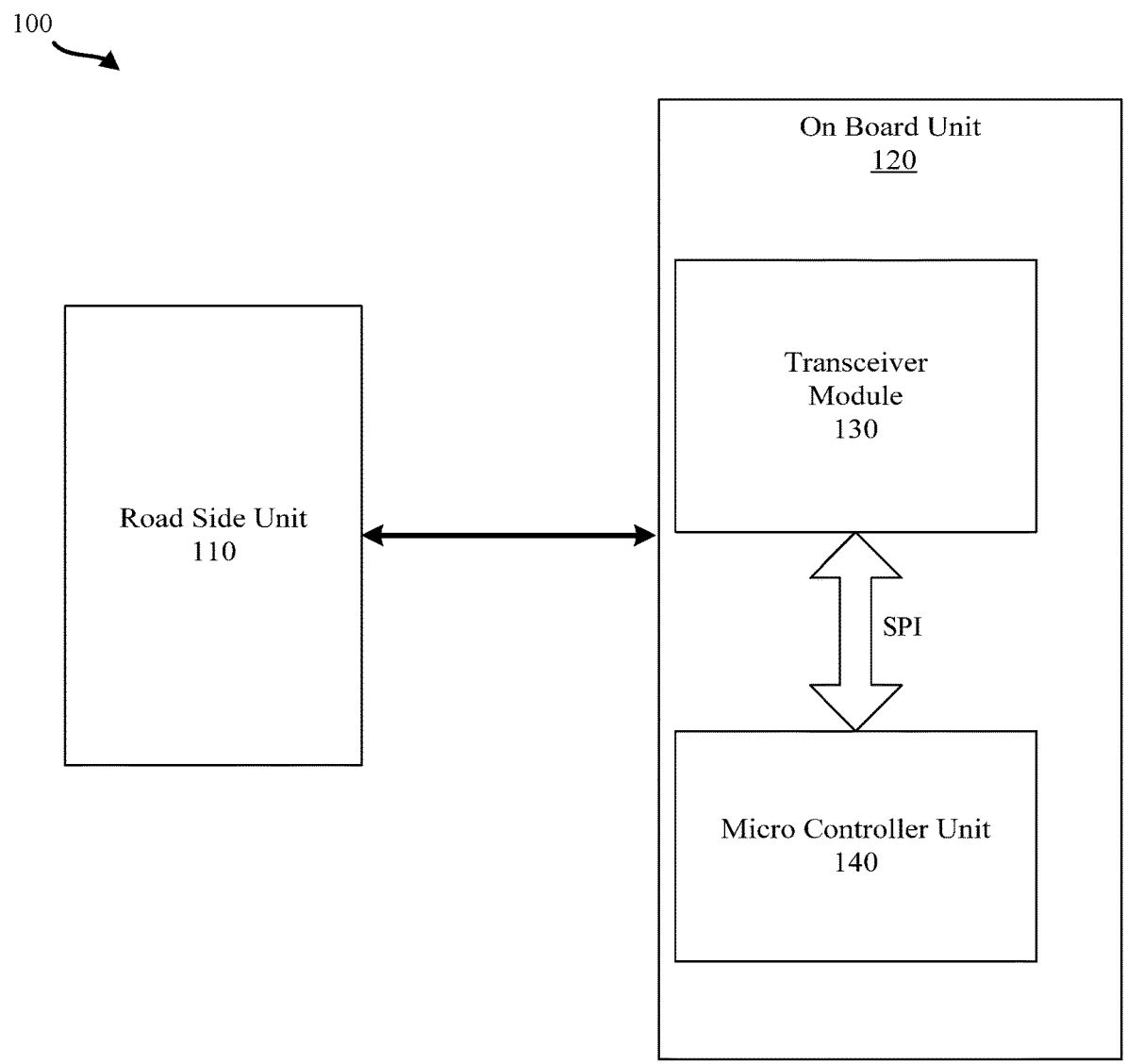
FIG. 1 is a block diagram illustrating an ETC system according to an embodiment of the invention.
Figure 4:
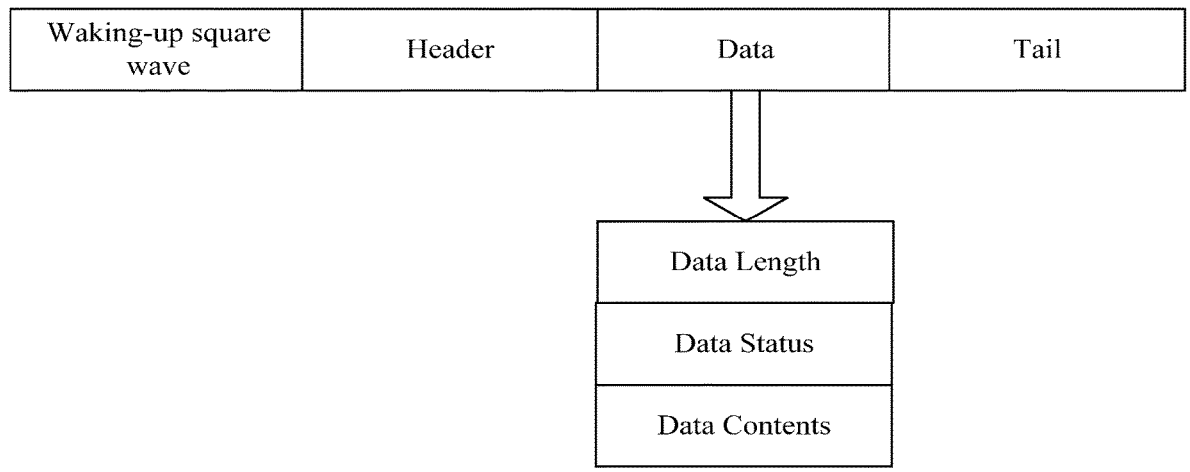
FIG. 4 is a structural schematic diagram illustrating a broadcast packet (BCP) according to an embodiment of the invention.

FIG. 1 is a block diagram illustrating an ETC system 100 according to an embodiment of the invention. The ETC system 100 comprises a road side unit (RSU) 110 and an on-board unit (OBU) 120 communicatively coupled to the RSU 110, wherein the OBU 120 comprises a transceiver module 130 and a micro controller unit (MCU) 140, and the transceiver module 130 is communicatively coupled to the MCU 140 via a serial peripheral interface (SPI) or other wired or wireless mechanism. In an embodiment, the transceiver module 130 receives a broadcast packet (BCP) from the RSU 110 and decodes the BCP. The BCP comprises a waking-up square wave, a header, data and a tail as shown in FIG. 4 and wherein the RSU 110 is configured to wake up the MCU 140 from a sleep state to an idle state upon receipt of the waking-up square wave. Then the MCU 140 receives and processes the data in the decoded BCP from the transceiver module 130. The transceiver module 130 converts the processed data to a wireless signal and transmits the wireless signal to the RSU 110.

Figure 2:
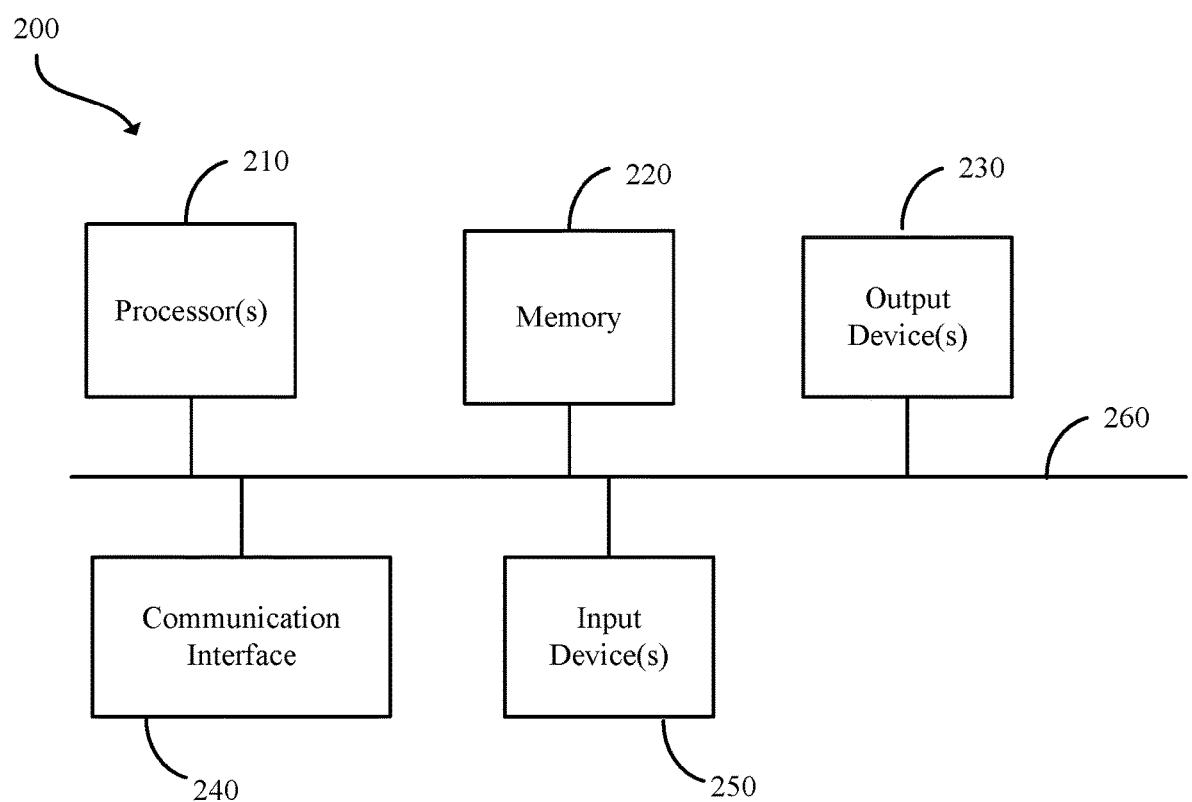
FIG. 2 is a high-level extent diagram showing an example architecture of a micro controller unit of FIG. 1 according to an embodiment of the invention.

FIG. 2 is a high-level extent diagram showing an example architecture 200 of the MCU 140 of FIG. 1. The architecture 200 includes one or more processors 210 and memory 220 coupled to an interconnect 260. The interconnect 260 shown in FIG. 2 is an abstraction that represents any one or more separate physical buses, point to point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, a CAN-bus (Controller Area Network), or an Institute of Electrical and Electronics Engineers (IEEE) standard 1394 bus, also called "Firewire", and/or any other suitable form of physical connection.

The processor(s) 210 is/are the central processing unit (CPU) of the architecture 200 and, thus, control the overall operation of the architecture 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the architecture 200. The memory 220 represents any form of random access memory (RAM), read-only memory (ROM), flash memory, or the like, or a combination of such devices. In use, the memory 220 may contain, among other things, software or firmware code for use in implementing at least some of the embodiments of the invention introduced herein.

Also connected to the processor(s) 210 through the interconnect 260 is a communications interface 240, such as, but not limited to, a network adapter, one or more output device(s) 230 and one or more input device(s) 250. Note that the output device(s) 230 and the input device(s) 250, like other devices, are optional. The communications interface 240 provides the architecture 200 with the ability to communicate with other components in the space adjusting system 100 and may be, for example, an Ethernet adapter or Fibre Channel adapter. The input device 250 may include a touch screen, keyboard, and/or mouse, etc. The output device 230 may include a screen and/or speakers, etc.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "module", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Figure 3A:
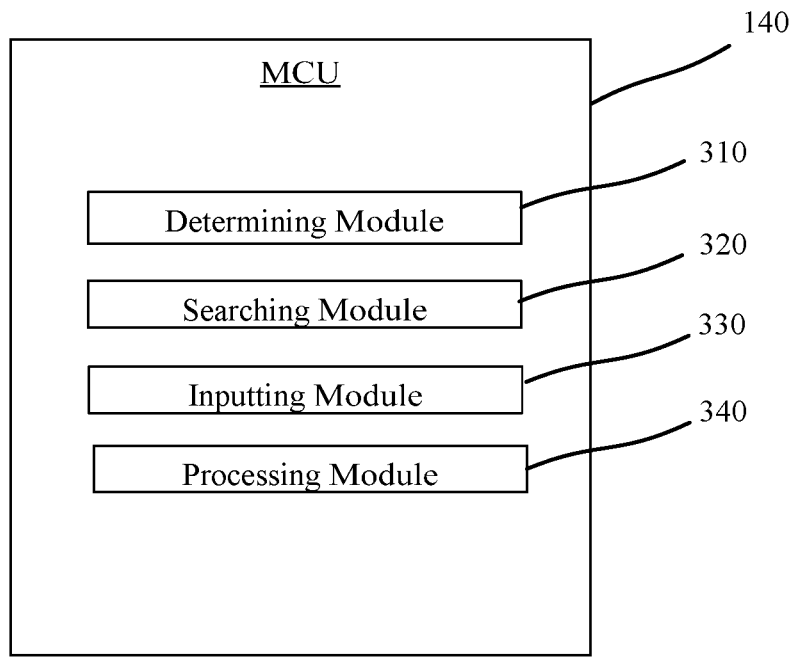
FIG. 3A is a block diagram showing elements of a memory of FIG. 2 according to an embodiment of the invention.
Figure 7:
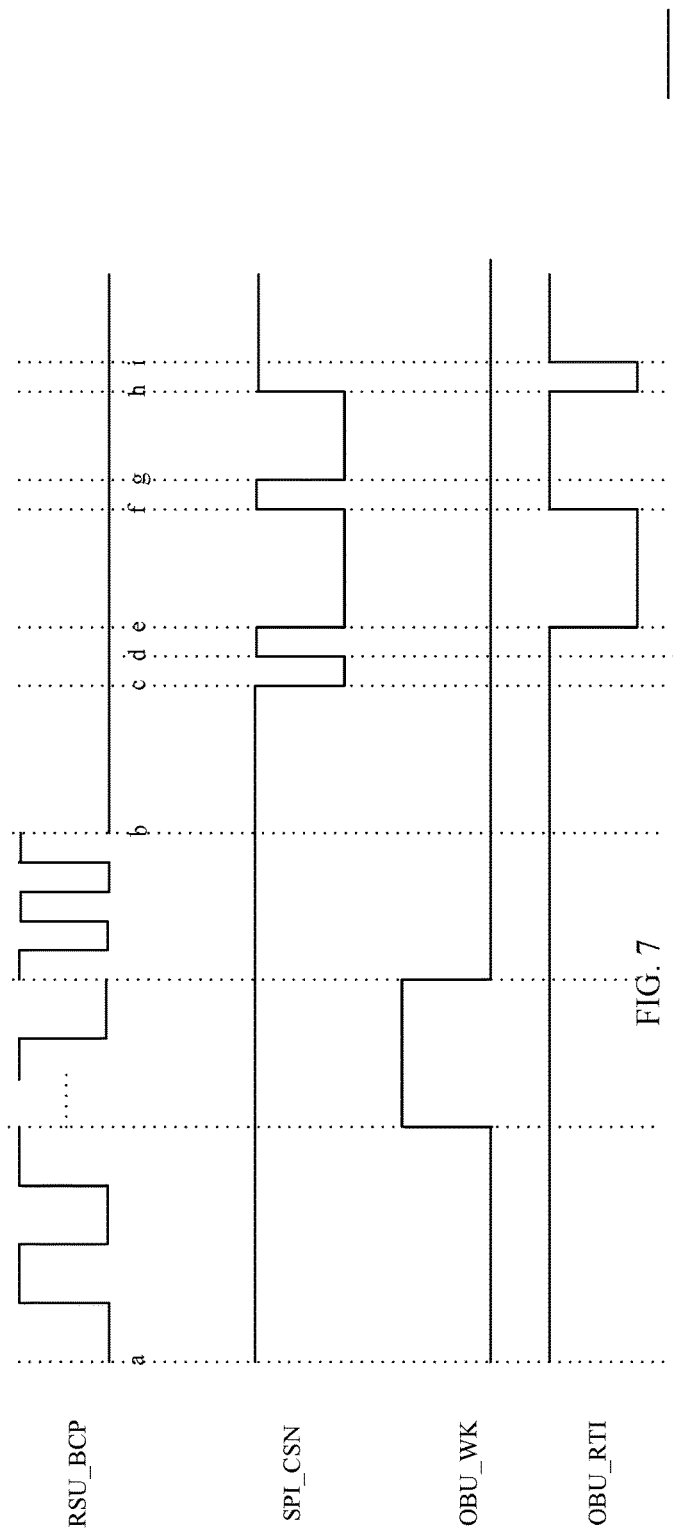
FIG. 7 is a sequence chart illustrating the OBU receives and transmits the BCP within 192 us according to an embodiment of the invention.

FIG. 3A is a block diagram showing elements of the memory 220 of FIG. 2 according to an embodiment of the invention, which includes a determining module 310, a searching module 320, an inputting module 330 and a processing module 340. In the embodiment, the determining module 310 determines whether there is a waking-up interrupt of a waking-up interrupt wave (refer to OBU_WK as shown in FIG. 7) from the transceiver module 130, wherein the waking-up interrupt is used to interrupt the idle state of the MCU 140 and then the MCU 140 starts to process the decoded BCP from the transceiver module 130. Specifically, if there is the waking-up interrupt of the waking-up interrupt wave, the searching module 320 starts to search for a low level state from a falling edge of the waking-up interrupt wave after the waking-up interrupt and then the determining module 310 further determines whether a duration time of low level is within a time range. If the duration time of low level of the waking-up interrupt wave is within the time range, the inputting module 330 inputs one byte into the transceiver module 130 and clears the waking-up interrupt and then the determining module 310 further determines whether there is a receiving interrupt of a receipt and transmission interrupt wave (refer to OBU_RTI as shown in FIG. 7) from the transceiver module 130, and wherein the receiving interrupt is used to interrupt data reception. That is, the MCU 140 stops receiving the data of the decoded BCP from the transceiver module 130 if there is the receiving interrupt. Then, the processing module 340 processes data of the broadcast packet.

Figure 3B:
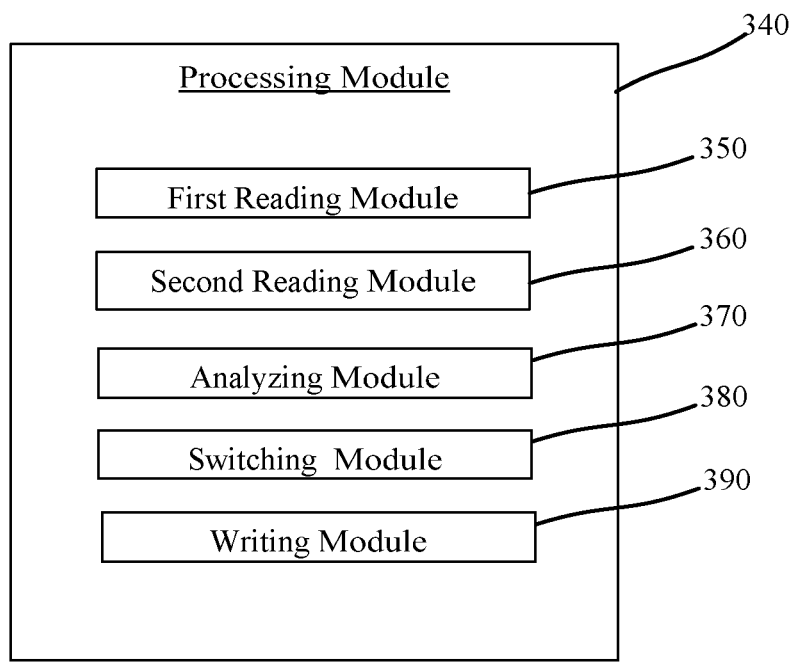
FIG. 3B is a block diagram illustrating a processing module of FIG. 3A according to another embodiment of the invention.

FIG. 3B is a block diagram illustrating the processing module 340 of FIG. 3A according to an embodiment of the invention. As shown in the FIG. 3B, the processing module 340 comprises a first reading module 350, a second reading module 360, an analyzing module 370, a switching module 380 and a writing module 390. In the embodiment, the first reading module 350 reads the length and status of the data of the broadcast packet from the processing module 340 after the receiving interrupt, and the second reading module 360 reads the contents of the data. Then, the analyzing module 370 analyzes the read contents of the data to obtain specific information from the analyzed data, wherein the specific includes license plate number, vehicle's type, car owner information, on-road driving information and traffic levy state information, etc. The switching module 380 then close a first channel for receiving the data from the transceiver module 130 and switch to a second channel for transmitting the processed data to the transceiver module 130. The writing module 390 writes the specific information via the second channel into the transceiver module 130, wherein the specific information is included in the processed data. After transmitting the data to the transceiver module 130, the MCU 140 clears a transmitting interrupt of the receipt and transmission interrupt wave, wherein a process of interruption is shown as follows:

```
{
    SPI_Read_Reg_Buf_fast_1( );      //read data length
    SPI_Read_Reg_Buf_fast_30( );     //receive data
    SPI_Write_Buf_Fast_4( );         // change channel
    SPI_Write_Buf_Fast_20( );        // transmit data
    SPI_Write_Buf_Fast_4( );         //clear interrupt;
}
```

In the embodiment, the shortest time window of the RSU 110 for communicating with the OBU 120 is 192 us, that is, the OBU 120 should complete the receiving and transmitting within 192 us. Now referring to the FIG. 7, point a to point b shows the BCP transmitted from the RSU 110, wherein the structure of the BCP is shown in FIG. 4. At point c, the MCU 140 transmits one byte to the transceiver module 130 to start a phase locked loop (PLL) circuit in the transceiver module 130 (not shown), wherein the locking time of the PLL is 120 us. At point e, the MCU 140 receives the receiving interrupt to stop receiving data from the transceiver module 130, wherein the time period from point b to point e is 80 us. At point h, the MCU 140 receives a transmitting interrupt to stop transmitting the processed data, wherein the time period from point c to point h is 120 us, which equivalents to the locking time of the PLL.

Still in the embodiment, for confirming the point c, the MCU 140 starts to search for a low level state from a falling edge of the waking-up interrupt wave after the waking-up interrupt and determine whether the low level state of the waking-up interrupt wave remains for a time period beginning at the point b. In one embodiment, the time period falls within a range of 54 us-72 us. That is, beginning at the point b, the point c can be selected from the range of 54 us-72 us. Specifically, the time window is 192 us and the locking time of the PLL is 120 us, thus the time period from the point b to point c can be smaller than (192 us-120 us). Further, the first reading module 350 of the MCU 140 reads the length and status of the data and the contents of the data from the transceiver module 130 is 18 us and this reading period can be partially overlapped with a time period of receiving the decoded BCP from the transceiver module 130. That is, reading the length and status of the data and the contents of the data and receiving the decoded BCP can be implemented simultaneously during the time period from point b to point e. Thus, the time period from the point b to point c should be greater than (72 us-18 us).

For example, the time period from the point b to point c is 70 us. In a software design, the process for confirming the point c is shown as follows:

```
{
#define TIMER_70us_VALUE 185
    TR0 =1;                          // Timer0 ON
    while(1)
    {
        if(TL0>TIMER_70us_VALUE)
        {
            SPI_Write_Buf_Fast_1( );   //write 1byte into FIFO
            SPI_Write_Buf_Fast_4( );   //clear Tx interrupt;
        }
    }
}
```

Figure 8:
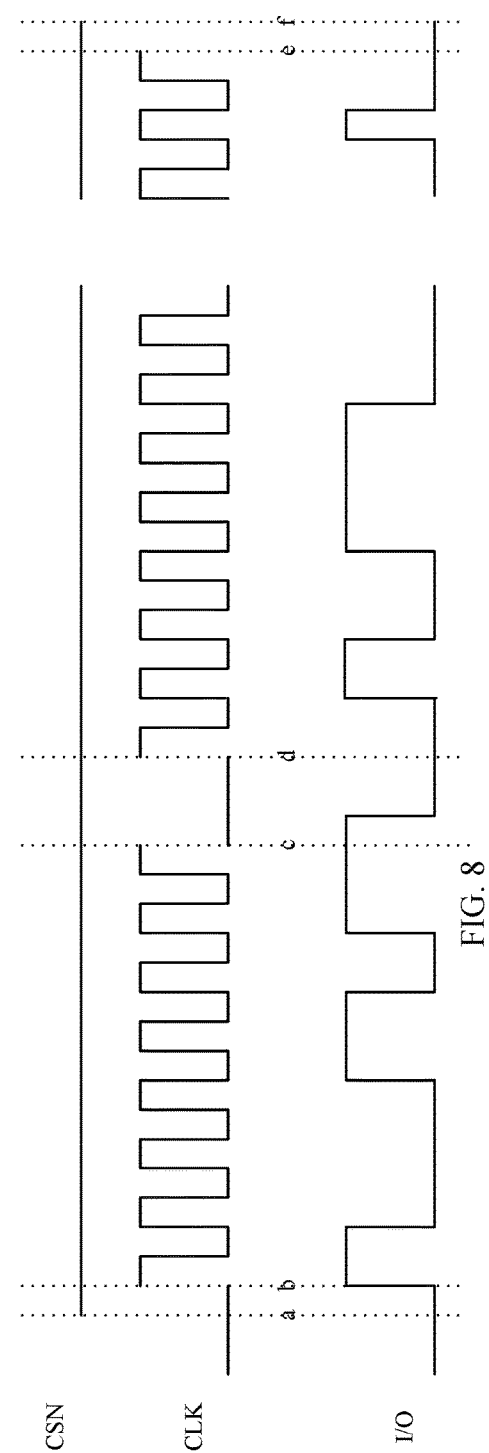
FIG. 8 is a sequence chart illustrating the MCU reads and writes the data from/into the transceiver module according to an embodiment of the invention.

Then the effective time for processing the decoded BCP by the MCU 140 is (120 us-(80 us-70 us)), wherein 120 us is the time period from point c to point h, i.e., the locking time of the PLL, 80 us is the time period from point b to point e for receiving the BCP from the transceiver module 130. Further, the data in the decoded BCP received by the MCU 140 is 30 bytes and then the processed data transmitted from the MCU 140 is 20 bytes. Based on the performance of SPI, a SPI clock is selected as 8 Hz for receiving data and 4 Hz for transmitting data, thus the time for reading the received data and writing the transmitted data is (30*1 us+20*2 us). In practice, the time interval between byte and byte when reading and writing via SPI is often greater than 1 us as the time interval between c and d as shown in FIG. 8 due to the FOR loop or other looping statements. For reducing the time interval, for example, to 250 ns, a process by using a statement for reading and writing single byte repeatedly is shown as follows:

```
{   //write 1byte through hardware SPI
while (TXBMT != 1) { }
    SPI0DAT =w_data0;          // Load the data into the buffer
    //read 1byte through hardware SPI
SPI0DAT = 0;
        while (TXBMT != 1) { }
        SPIF = 0;
        while (SPIF != 1) { }
        w_data0 = SPI0DAT;     // Read the data into the buffer
}
```

Thus the time for reading the received data and writing the transmitted data including the time intervals between bytes is (30*1 us+29*025. us+20*2 us+19*0.25 us), i.e., 82 us. Then, the remaining time is (110 us-82 us), which is used to read the length and status of the data and contents of the data (i.e., 18 us as mentioned above) and also used to analyze the read contents to obtain specific information from the analyzed data (i.e., 10 us). Wherein, the specific information comprises license plate number, vehicle's type, car owner information, on-road driving information and traffic levy state information, etc.

In one embodiment, the transceiver module 130 can be a BK5822 and the MCU 140 can be c8051f320 produced by SiliconLab.

Figure 5:
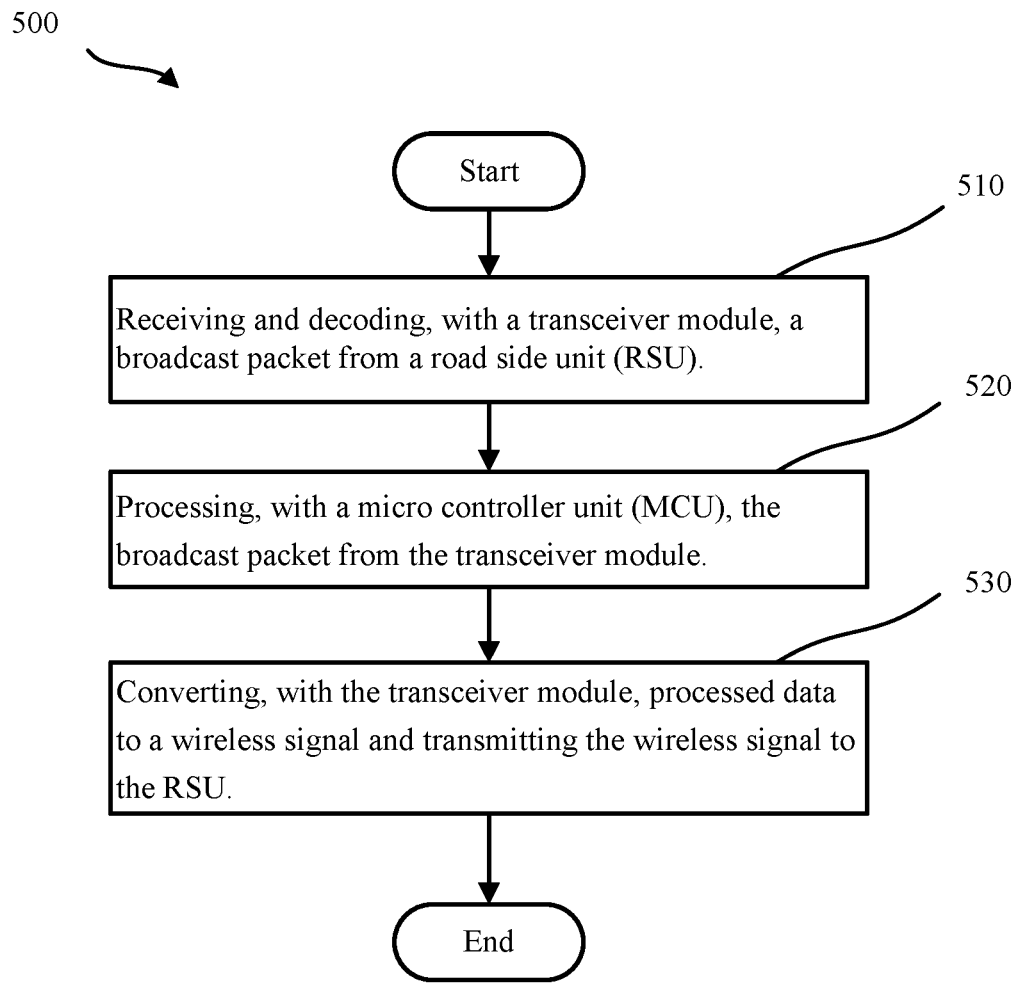
FIG. 5 is a flowchart illustrating a method for improving transmitting and receiving performance in an on-board unit (OBU) according to an embodiment of the invention.

FIG. 5 is a flowchart illustrating a method 500 for improving transmitting and receiving performance in an on-board unit (OBU) according to an embodiment of the invention. As shown in FIG. 5, the method 500 comprises receiving and decoding (510), with a transceiver module, a broadcast packet (BCP) from a road side unit (RSU), wherein the BCP comprises a waking-up square wave, a header, data and a tail as shown in the FIG. 4; processing (520), with a micro controller unit (MCU), the decoded broadcast packet from the transceiver module, wherein the waking-up square wave is configured to wake up the MCU 140 from a sleep state to an idle state; converting (530), with the transceiver module, processed data to a wireless signal and transmitting the wireless signal to the RSU.

Figure 6:
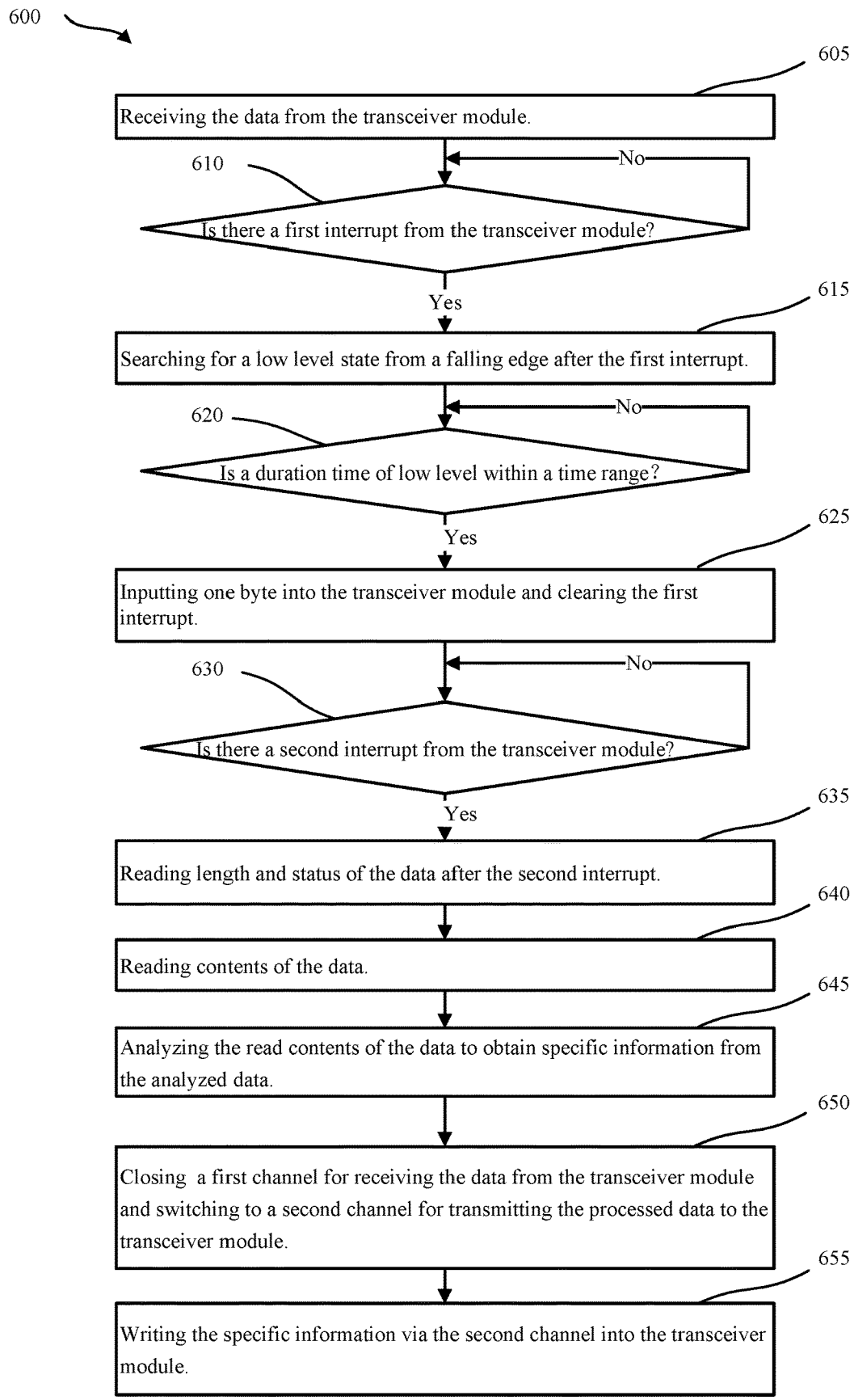
FIG. 6 is a flowchart illustrating a method for processing the decoded broadcast packet of FIG. 5 according to a further embodiment of the invention.

FIG. 6 is a flowchart illustrating a method for processing the decoded broadcast packet of FIG. 5 according to an embodiment of the invention. As shown in FIG. 6, the method 600 comprises receiving (605) the data in the decoded BCP from the transceiver module; determining (610) whether there is a waking-up interrupt from the transceiver module, wherein the waking-up interrupt is used to interrupt the idle state of the MCU; if yes, searching (615) for a low level state from a falling edge after the waking-up interrupt; determining (620) whether a duration time of low level is within a time range; if yes, inputting (625) one byte into the transceiver module and clearing the waking-up interrupt; determining (630) whether there is a receiving interrupt from the transceiver module, wherein the receiving interrupt is used to interrupt data reception, that is, the MCU stops receiving the data from the transceiver module if there is the receiving interrupt and then starts to process the data in the decoded BCP. The processing the data comprises reading (635) length and status of the data; reading (640) contents of the data; analyzing (645) the read contents of the data to obtain specific information from the analyzed data, wherein the specific includes license plate number, vehicle's type, car owner information, on-road driving information and traffic levy state information, etc.; closing (650) a first channel for receiving the data from the transceiver module and switching to a second channel for transmitting the processed data to the transceiver module; writing (655) the specific information via the second channel into the transceiver module, wherein the specific information is included in the processed data.

The method 500 and method 600 can be implemented in the OBU 120 as shown in FIG. 1. The above detailed description of the OBU 120 are omitted for elements already described with respect to FIGS. 1-4 and 7-8.

Based on the above method in the OBU for the receiving and transmitting, the communication time between the RSU and the OBU can be limited within 192 us and thus improving the transactional efficiency of the ETC system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural components that do not differ from the literal language of the claims, or if they include equivalent structural components with insubstantial differences from the literal languages of the claims.

What is claimed is:

1. A method in an on-board unit (OBU), comprising:
    receiving and decoding, with a transceiver module, a broadcast packet from a road side unit (RSU);
    processing, with a micro controller unit (MCU), the broadcast packet from the transceiver module, wherein the processing comprises:
        determining whether there is a first interrupt from the transceiver module, wherein the first interrupt is used to interrupt the idle state of the MCU;
        searching for a low level state from a falling edge after the first interrupt if there is the first interrupt;
        determining whether a duration time of low level is within a time range;
        inputting one byte into the transceiver module if the duration time is within the time range and clearing the first interrupt;
        determining whether there is a second interrupt from the transceiver module, wherein the second interrupt is used to interrupt data reception; and
        processing data in the broadcast packet if there is the second interrupt; and
    converting, with the transceiver module, processed data to a wireless signal and transmitting the wireless signal to the RSU;
wherein the processing data in the broadcast packet comprises:
    reading length and status of the data after the second interrupt; reading contents of the data;
    analyzing the read contents of the data to obtain specific information from the analyzed data;
    closing a first channel for receiving the data from the transceiver module and switching to a second channel for transmitting the processed data to the transceiver module; and
    writing the specific information via the second channel into the transceiver module, wherein the specific information is included in the processed data.

2. The method of claim 1, wherein the specific information comprises license plate number, vehicle's type, car owner information, on-road driving information and traffic levy state information.

3. The method of claim 2, wherein a time window of the RSU for communicating with the OBU is 192 us, and wherein a time period from a tail of the BCP to the second interrupt is 80 us, a time period from inputting one byte into the transceiver module to transmitting the processed data is 120 us and the time range is 54 us-72 us.

4. The method of claim 3, wherein an interval between each two bytes in the data is shortened to 250 ns.

5. An on-board unit (OBU), comprising:
a transceiver module, configured to receive and decode a broadcast packet from a road side unit (RSU);
a micro controller unit (MCU) communicatively coupled to the transceiver module and configured to receive and process the broadcast packet from the transceiver module, wherein the MCU comprises:
a determining module, configured to determine whether there is a first interrupt from the transceiver module, wherein the first interrupt is used to interrupt the idle state of the MCU;
a searching module, configured to search for a low level state from a falling edge after the first interrupt if there is the first interrupt, and wherein the determining module further configured to determine whether a duration time of low level is within a time range;
an inputting module, configured to input one byte into the transceiver module if the duration time is within the time range and clear the first interrupt, and wherein the determining module further configured to determine whether there is a second interrupt from the transceiver module, and wherein the second interrupt is used to interrupt data reception; and
a processing module, configured to process data in the broadcast packet if there is the second interrupt; and wherein the transceiver module is further configured to convert processed data to a wireless signal and transmit the wireless signal to the RSU;
wherein the processing module comprises:
a first reading module, configured to read length and status of the data after the second interrupt;
a second reading module, configured to read contents of the data;
an analyzing module, configured to analyze the read contents of the data to obtain specific information from the analyzed data;
a switching module, configured to close a first channel for receiving the data from the transceiver module and switch to a second channel for transmitting the processed data to the transceiver module; and
a writing module, configured to write the specific information via the second channel into the transceiver module, wherein the specific information is included in the processed data.

6. The OBU of claim 5, wherein the specific information comprises license plate number, vehicle's type, car owner information, on-road driving information and traffic levy state information.

7. The OBU of claim 6, wherein a time window of the RSU for communicating with the OBU is 192 us, and wherein a time period from a tail of the BCP to the second interrupt is 80 us, a time period from inputting one byte into the transceiver module to transmitting the processed data is 120 us and the time range is 54 us-72 us.

8. The OBU of claim 7, wherein an interval between each two bytes in the data is shortened to 250 ns.

9. A computer-readable storage medium storing instructions that, when executed by a computing device, cause the computing device to:
receive and decode, with a transceiver module in the computing device, a broadcast packet from a road side unit (RSU);
process, with a micro controller unit (MCU) in the computing device, the broadcast packet from the transceiver module, wherein the processing comprises:
determine whether there is a first interrupt from the transceiver module, wherein the first interrupt is used to interrupt the idle state of the MCU;
search for a low level state from a falling edge after the first interrupt if there is the first interrupt;
determine whether a duration time of low level is within a time range; input one byte into the transceiver module if the duration time is within the time range and clearing the first interrupt;
determine whether there is a second interrupt from the transceiver module, wherein the second interrupt is used to interrupt data reception; and process data in the broadcast packet if there is the second interrupt; and
convert, with the transceiver module, processed data to a wireless signal and transmitting the wireless signal to the RSU;
wherein the instructions for processing data in the broadcast packet cause the computing device to:
read length and status of the data after the second interrupt;
read contents of the data; analyze the read contents of the data to obtain specific information from the analyzed data;
close a first channel for receiving the data from the transceiver module and switch to a second channel for transmitting the processed data to the transceiver module; and
write the specific information via the second channel into the transceiver module, wherein the specific information is included in the processed data.

10. The computer readable medium of claim 9, wherein the specific information comprises license plate number, vehicle's type, car owner information, on-road driving information and traffic levy state information.

11. The computer readable medium of claim 10, wherein a time window of the RSU for communicating with the OBU is 192 us, and wherein a time period from a tail of the BCP to the second interrupt is 80 us, a time period from inputting one byte into the transceiver module to transmitting the processed data is 120 us and the time range is 54 us-72 us.

12. The computer readable medium of claim 11, wherein an interval between each two bytes in the data is shortened to 250 ns.

* * * * *